(12) United States Patent
Belmonte Rodrigues de Castro et al.

(10) Patent No.: US 9,029,469 B2
(45) Date of Patent: May 12, 2015

(54) WOOD PROTECTION PAINTS

(71) Applicant: Celanese Emulsions GmbH, Sulzbach (Taunus) (DE)

(72) Inventors: Lizandra Belmonte Rodrigues de Castro, Mainz (DE); Thomas Fichtner, Dalheim (DE); Petra Klingel, Frankfurt (DE); Stephan Krieger, Hofheim (DE)

(73) Assignee: Celanese Emulsions GmbH, Sulzbach (Taunus) (DE)

( * ) Notice: Subject to any disclaimer, the term of this patent is extended or adjusted under 35 U.S.C. 154(b) by 0 days.

(21) Appl. No.: 13/906,547

(22) Filed: May 31, 2013

(65) Prior Publication Data

US 2013/0338299 A1 Dec. 19, 2013

Related U.S. Application Data

(60) Provisional application No. 61/661,501, filed on Jun. 19, 2012.

(51) Int. Cl.
*C09D 5/00* (2006.01)
*C08F 263/04* (2006.01)
*C09D 151/00* (2006.01)
*C09D 151/06* (2006.01)
C08F 210/02 (2006.01)
C08F 218/08 (2006.01)
C08F 220/14 (2006.01)
C08F 230/08 (2006.01)

(52) U.S. Cl.
CPC .............. *C09D 5/00* (2013.01); C08F 210/02 (2013.01); C08F 218/08 (2013.01); C08F 220/14 (2013.01); *C08F 263/04* (2013.01); C08F 2230/085 (2013.01); *C09D 151/003* (2013.01); *C09D 151/06* (2013.01)

(58) Field of Classification Search
USPC .................................................. 524/563, 521
See application file for complete search history.

(56) References Cited

U.S. PATENT DOCUMENTS

| 6,706,805 | B2 * | 3/2004 | Weitzel .......................... 524/563 |
| 7,078,455 | B2 | 7/2006 | Heldmann et al. |
| 8,436,088 | B2 * | 5/2013 | Cabrera et al. ................ 524/425 |
| 2007/0244238 | A1 | 10/2007 | Desor et al. |
| 2009/0043035 | A1 * | 2/2009 | Cabrera ......................... 524/457 |
| 2009/0069495 | A1 * | 3/2009 | Fichtner et al. ................ 524/555 |
| 2009/0203814 | A1 * | 8/2009 | Petri et al. ........................ 524/35 |

FOREIGN PATENT DOCUMENTS

EP 2676980 A1 * 12/2013
WO WO-2013/093632 A3 * 6/2013

* cited by examiner

Primary Examiner — Peter D. Mulcahy
(74) Attorney, Agent, or Firm — Roberts Mlotkowski Safran & Cole P.C.

(57) ABSTRACT

A wood protection paint comprises a copolymer emulsion prepared by an emulsion polymerization process, in which a first monomer composition comprising from 60 weight percent to 95 weight percent of at least one vinyl ester, and from 5 weight percent to 40 weight percent ethylene is polymerized in a first stage under ethylene pressure to produce a first stage product having a $T_g$ of less than 25° C. Then, in a second stage, a second monomer composition selected such that the polymer produced by the second monomer composition has a $T_g$ of at least 95° C.

15 Claims, No Drawings

WOOD PROTECTION PAINTS

FIELD

The present invention relates to wood protection paints formulated from vinyl ester-ethylene/acrylic multistage emulsions.

BACKGROUND

Polymer dispersions derived from vinyl esters and monomers copolymerizable therewith, particularly vinyl acetate/ethylene (VAE) copolymers, and their use as binders for paints and plasters are well known. Such polymer dispersions are typically prepared by emulsion polymerization; with the polymerization being effected in one or more stages. In the polymerization processes which have become known to date, monomer mixtures are converted by free-radical polymerization by addition of initiators in the presence of protective colloids and/or emulsifiers. However, when used in binder-rich coatings (low pigment volume concentration or "pvc"), such as exterior wood protection paints, current VAE dispersions exhibit higher water uptake, higher algal and fungal growth, blistering and higher dirt pick-up than the pure acrylic emulsions normally used for exterior wood paints.

There is therefore a need to develop improved wood protection paints based on vinyl ester copolymers which are non-blistering and exhibit low water uptake, low algal and fungal growth, low dirt pick-up and high color retention.

U.S. Patent Application Publication No. 2009/0069495 to Fichtner et al. ("Fichtner") is directed to coating compositions comprising binders based on polyvinyl ester dispersions prepared by a multistage polymerization process. In a first stage, a polyvinyl ester dispersion is prepared by polymerizing at least one vinyl ester of a saturated carboxylic acid (and optionally further monomers copolymerizable therewith) in the presence of at least one emulsifier and/or at least one protective colloid. In a second stage, monomers in a dissolved form, a pure form, or in the form of an emulsion are added to the reaction mixture and polymerized. The polyvinyl ester dispersions of Fichtner comprise polymerized silanes and/or epoxides, and are said to offer high weathering resistance when used in plasters and other exterior coatings, such as façade paints. However, the dispersions of Fichtner suffer from the disadvantage of producing coatings with high water permeability (w-value).

U.S. Patent Application Publication No. 2009/0203814 to Petri et al. ("Petri") discloses multistage polymers derived from hard and soft monomer compositions containing vinyl esters, of which at least one monomer composition must contain an unsaturated organosilicon compound. The dispersions of Petri are suitable for the formation of solvent-free coating materials which exhibit little foam formation and are said to offer improved blocking resistance, gloss and abrasion resistance in coatings produced therewith. However, the dispersions of Petri suffer from the disadvantage of a high dirt pick behavior when those dispersions are used in exterior paints and plasters.

U.S. Patent Application Publication No. 2007/0244238 to Desor et al. ("Desor") is directed to polymer dispersions prepared by emulsion polymerization containing at least two copolymers, A and B, with glass transition temperatures differing by at least 10° C. In emulsion polymerization, usually one or more emulsifiers are used. Attempts have been made to avoid the use of alkylphenol ethoxylates ("APEO") as nonionic emulsifiers due to health and environmental concerns. Accordingly, Desor's dispersions either contain no alkylphenol ethoxylates ("APEO"), or contain such small amounts thereof to be suitable for the preparation of wood varnishes, glazes and gloss paints. An APEO-free emulsifier is also provided by Desor, which ensures a desired shear stability of multistage polymer dispersions, and does not adversely affect the blooming and water resistance of the dispersion. However, the emulsions described in US 2007/0244238 display insufficient elasticity when used in exterior paint formulations for wood having pigments and more than 5% fillers.

U.S. Pat. No. 7,078,455 to Heldmann et al. ("Heldmann") is directed to aqueous plastic material dispersions based on vinyl ester copolymers. More particularly, Heldmann's dispersion is based on a vinyl ester copolymer having a solid content of up to 80% by weight substantially stabilized by ionic components, and a minimum film formation temperature (MFFT) of less than 20° C. However, the dispersions of Heldmann suffer from the disadvantage of a high dirt pick behavior when the dispersions are used in exterior paints and plasters.

According to the present invention, it has now been found that a particular vinyl ester-ethylene acrylic dispersion prepared in a multistage polymerization process provides an exterior wood protection paint that is resistant to blistering and exhibits low water uptake, low algal and fungal growth, low dirt pick-up, high color retention and sufficient elasticity when applied on wood.

SUMMARY

Accordingly, the invention resides in one aspect in a wood protection paint comprising a copolymer emulsion prepared by an emulsion polymerization process comprising:

(a) polymerizing, in a first stage and under ethylene pressure, a first monomer composition comprising from about 60 weight percent to about 95 weight percent of at least one vinyl ester, and from about 5 weight percent to about 40 weight percent ethylene to produce a first stage product having a glass transition temperature $T_g$ of less than 25° C., such as from 5 to 15° C.; and (b) polymerizing, in a second stage and in the presence of said first stage product, a second monomer composition such that the polymer produced by said second monomer composition has a glass transition temperature $T_g$ of at least 95° C., such as from 95 to 170° C.

Conveniently, the at least one vinyl ester a first monomer composition comprises vinyl acetate.

Generally, the second monomer composition comprises at least 90 weight percent, typically at least 95 weight percent, of a (meth)acrylic ester or of a mixture of at least two different (meth)acrylic esters.

In one embodiment, the second monomer composition comprises at least 90 weight percent of methyl methacrylate, cyclohexyl methacrylate, isobornyl methacrylate, t-butyl methacrylate or a mixture thereof. In another embodiment, the second monomer composition comprises at least 90 weight percent of a mixture of methyl methacrylate with an acrylic ester selected from the group consisting of butyl acrylate and ethylhexyl acrylate.

Conveniently, one or both the first and second monomer compositions further comprises from 0.05 weight percent to about 5 weight percent of at least one of an ethylenically unsaturated mono- and/or dicarboxylic acid, an ethylenically unsaturated sulfonic acid, an ethylenically unsaturated phosphoric acid, an ethylenically unsaturated phosphonic acid, and an amide of an ethylenically unsaturated mono- and/or dicarboxylic acid.

Conveniently, the weight ratio of the first monomer composition to the second monomer composition is in the range 60:40 to 95:5.

DETAILED DESCRIPTION OF THE EMBODIMENTS

An exterior wood protection paint is described in which the binder comprises an aqueous copolymer emulsion prepared by a multistage emulsion polymerization process, in which a first monomer composition comprising from about 60 weight percent to about 95 weight percent of at least one vinyl ester, and from about 5 weight percent to about 40 weight percent ethylene is polymerized under ethylene pressure in a first stage to produce a first stage product having a glass transition temperature $T_g$ of less than 25° C., such as from about 5 to about 15° C. A second monomer composition such that the polymer produced by said second monomer composition has a glass transition temperature $T_g$ of at least 95° C., typically 95 to about 170° C. is then polymerized, in a second stage and in the presence of said first stage product.

The glass transition temperatures of the copolymers produced by the present process are calculated by the Fox Flory equation. In this respect, it will be appreciated that the glass transition temperatures of the copolymers can be adjusted by selection of the monomer combinations in a manner known per se by the person skilled in the art.

The first monomer mixture employed in the present process from about 60 weight percent to about 95 weight percent, such as from about 65 weight percent to about 90 weight percent of at least one vinyl ester of a carboxylic acid. Suitable vinyl esters include vinyl esters of straight-chain and/or branched aliphatic carboxylic acids having from one to eighteen carbon atoms. In addition, it is also possible to use vinyl esters of aromatic carboxylic acids.

The preferred monomers of this type include vinyl formate, vinyl acetate, vinyl propionate, vinyl butyrate, vinyl isobutyrate, vinyl pivalate, vinyl 2-ethylhexanoate, vinyl esters of saturated branched monocarboxylic acids having from 9 to 11 carbon atoms in the acid radical, such as VeoVa 9, VeoVA 10 and VeoVa 11, vinyl esters of relatively long-chain saturated or unsaturated fatty acids, for example vinyl laurate or vinyl stearate, and also vinyl esters of benzoic acid and substituted derivatives of benzoic acid such as vinyl p-tert-butylbenzoate. Vinyl acetate is particularly preferred.

In addition to the vinyl ester, the first monomer composition comprises ethylene in an amount from about 5 weight percent to about 40 weight percent, such as from about 10 weight percent to about 30 weight percent, of the total monomers in the first monomer composition.

Optionally, the first monomer composition further comprises from 0.05 weight percent to about 5 weight percent of at least one acid monomer selected from at least one of an ethylenically unsaturated mono- and/or dicarboxylic acid and/or an amide thereof, an ethylenically unsaturated sulfonic acid, an ethylenically unsaturated phosphoric acid and an ethylenically unsaturated phosphonic acid. Generally, the acid monomer includes 3 to 8 carbon atoms, such as ethylenically unsaturated $C_3$-$C_8$ monocarboxylic acids and ethylenically unsaturated $C_4$-$C_8$ dicarboxylic acids, together with the anhydrides or amides thereof and the monoesters of ethylenically unsaturated $C_4$-$C_8$ dicarboxylic acids.

Examples of ethylenically unsaturated $C_3$-$C_8$ monocarboxylic acids include acrylic acid, methacrylic acid and crotonic acid, and the anhydrides and amides thereof. Examples of ethylenically unsaturated $C_4$-$C_8$ dicarboxylic acids include maleic acid, fumaric acid, itaconic acid and citraconic acid, and the mono- or bisamides thereof and their monoesters with $C_1$-$C_{12}$, preferably $C_1$-$C_4$, alkanols, such as, for example, monomethyl maleate and mono-n-butyl maleate.

Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid and vinylbenzenesulfonic acid. Examples of suitable ethylenically unsaturated phosphonic acids also include those having 2-8 carbon atoms, such as vinylphosphonic acid.

In addition to or instead of said acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

Further optional comonomers used in the first monomer composition are esters of α,β-unsaturated monocarboxylic acids and/or monoesters or preferably diesters of α,β-unsaturated dicarboxylic acids with primary, secondary and/or tertiary saturated monohydric alcohols having from 1 to 20 carbon atoms. These may, for example, be the methyl, ethyl, propyl, butyl or the 2-ethylhexyl esters of acrylic acid, of methacrylic acid and/or itaconic acid, or the corresponding monoesters or especially diesters of maleic acid, fumaric acid or citraconic acid, and also the esters of the mono- and/or dicarboxylic acids mentioned with cycloaliphatic or polycyclic alcohols and of fatty alcohols. These comonomers can be present in an amount up to 25% by weight, preferably up to 15% by weight, of the total monomers in the first monomer composition.

Further optional comonomers used in the first monomer composition are epoxy-functional, ethylenically unsaturated compounds, such as glycidyl methacrylate, glycidyl acrylate and/or vinylepoxycyclohexane. These comonomers can be present in an amount up to 10% by weight, preferably up to 5% by weight, of the total monomers in the first monomer composition.

Further optional comonomers used in the first monomer composition are silicone-functional, ethylenically unsaturated compounds such as acryloyloxyalkyltri(alkoxy)silanes and methacryloyloxyalkyltri(alkoxy)silanes, vinyltrialkoxysilanes and/or vinylalkyldialkoxysilanes. These comonomers can be present in an amount up to 5% by weight, preferably up to 3% by weight, preferably up to 1% by weight, of the total monomers in the first monomer composition.

Further optional comonomers used in the first monomer composition are polyethylenically unsaturated and hence crosslinking comonomers, for example diallyl phthalate, diallyl maleate, triallyl cyanurate, tetraallyloxyethane, divinylbenzene, butanediol 1,4-dimethacrylate, triethylene glycol dimethacrylate, divinyl adipate, allyl(meth)acrylate, vinyl crotonate, methylenebisacrylamide, hexanediol diacrylate, pentaerythritol diacrylate and trimethylolpropane triacrylate, or mixtures of two or more compounds from this group. These comonomers can be present in an amount up to 10% by weight, preferably up to 2% by weight, of the total monomers in the first monomer composition.

Further optional comonomers used in the first monomer composition are hydroxy-functional esters of unsaturated carboxylic acids, such as hydroxyethyl(meth)acrylate, hydroxypropyl(meth)acrylate and adducts thereof with ethylene oxide or propylene oxide. These comonomers can be present in an amount up to 10% by weight, preferably up to 5% by weight, of the total monomers in the first monomer composition.

Further optional comonomers used in the first monomer composition are ethylenically unsaturated compounds containing crosslinkable groups, such as carbonyl groups or N-methylol groups. Examples thereof are diacetoneacrylamide, allyl acetoacetate, vinyl acetoacetate, acetoacetoxyethyl(meth)acrylate, N-ethanol(meth)acrylamide, N-propanol (meth)acrylamide, (meth)acrylamide, allyl carbamate, acrylonitrile, the N-methylol esters, N-methylol alkyl ethers or Mannich bases of N-methylol(meth)acrylamide or N-methylolallyl carbamate, acrylamidoglycolic acid and/or salts thereof, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide, ethylimidazolidone methacrylate or N-vinylformamide, N-vinylpyrrolidone. These comonomers can be present in an amount up to 5% by weight, preferably up to 3% by weight, of the total monomers in the first monomer composition.

As described below crosslinkable groups, such as carbonyl groups like diacetoneacrylamide, allyl acetoacetate, vinyl acetoacetate, acetoacetoxyethyl(meth)acrylate are preferably used in combination with additives, such as dicarboxylic acid dihydrazides like adipidic acid dihydrazide.

The monomers used in the second monomer composition are selected such that the homo- or copolymer produced thereby has a $T_g$ of at least 95° C., such as from 95 to 170° C., preferably 95 to 160° C., more preferably 95 to 150° C. Generally, the second monomer composition comprises at least 90 weight percent, preferably at least 95 weight percent, of one or more methacrylic or acrylic esters Thus, in one embodiment, the second monomer composition comprises at least 90 weight percent of a one or more (meth)acrylic esters, each of whose the homopolymer has a $T_g$ of at least 95° C., such as methyl methacrylate ($T_g$ of 105° C.), cyclohexyl methacrylate ($T_g$ of 110° C.), isobornyl methacrylate (Tg of 110° C.) and t-butyl methacrylate ($T_g$ of 118° C.). In an alternative embodiment, the second monomer composition comprises at least 90 weight percent of a mixture of methyl methacrylate with an acrylic ester selected from the group consisting of butyl acrylate and ethylhexyl acrylate. The second monomer composition is polymerized in the presence of the polymer product of the first stage polymerization.

Additional monomers can also be polymerized in the second stage. In principle, it is possible to use in the second stage any of the monomers mentioned above as useable in the first stage.

The additional monomer classes usable in the second stage are thus generally vinyl esters of straight-chain and/or branched aliphatic carboxylic acids having from one to eighteen carbon atoms, vinyl esters of aromatic carboxylic acids, ethylenically unsaturated aliphatic or cycloaliphatic hydrocarbons, vinylaromatics, especially styrene, α-methylstyrene, vinyltoluene and/or vinyl xylene, halogenated unsaturated aliphatic hydrocarbons, α,β-unsaturated mono- and/or dicarboxylic acids, ethylenically unsaturated sulfonic acids and/or phosphonic acids or salts thereof, esters of α,β-unsaturated monocarboxylic acids with primary, secondary and/or tertiary saturated monohydric alcohols having from 1 to 20 carbon atoms, monoesters or preferably diesters of α,β-unsaturated dicarboxylic acids with primary, secondary and/or tertiary saturated monohydric alcohols having from 1 to 20 carbon atoms, epoxy-functional ethylenically unsaturated compounds, silicone-functional ethylenically unsaturated compounds, polyethylenically unsaturated and hence crosslinking comonomers, hydroxy-functional esters of unsaturated carboxylic acids, and crosslinkable or self-crosslinking ethylenically unsaturated comonomers. Preferred monomers are unsaturated copolymerizable carboxylic acids, unsaturated sulfonic acids, unsaturated phosphonic acids, unsaturated phosphoric acids, and carboxamides and their salts. Also preferred are ethylenically unsaturated hydrolysable silicon compounds, ethylenically unsaturated epoxide compounds, epoxy silane compounds, ethylenically unsaturated 1,3-dicarbonyl compounds, di or polyethylenically unsaturated monomers, unsaturated carboxamides, and unsaturated ethylene urea compounds.

Preferably, the weight ratio of the first monomer composition to the second monomer composition is in the range 60:40 to 95:5.

The multistage dispersions produced by the present process may comprise at least one protective colloid and/or comprise at least one emulsifier.

Suitable protective colloids, i.e. polymeric stabilizers, are methylcelluloses, hydroxyethyl- and propylcelluloses, and also sodium carboxymethylcellulose, gelatin, casein, starch, gum arabic, hydroxy ethyl starch and sodium alginate.

The preferred protective colloid is polyvinyl alcohol. Suitable polyvinyl alcohol has degrees of hydrolysis of from 60 to 100 mol % and viscosities of the 4% aqueous solutions at 20° C. of 2-70 mPa*s, especially from 30 to 70 mPa*s.

The protective colloids mentioned can of course also be used in the form of mixtures.

When protective colloids are used, the amount thereof, based on the total amount of monomers used, is typically from 0.1 to 5 parts by weight, preferably from 0.3 to 5 parts by weight.

In a preferred variant, the present dispersions contain no protective colloid at all, or the amount of protective colloid, based on the total amount of monomers used, is less than 1% by weight, more preferably less than 0.7% by weight.

The emulsifiers used are generally nonionic emulsifiers or combinations of nonionic with ionic emulsifiers.

Examples of nonionic emulsifiers are acyl, alkyl, oleyl and alkylaryl ethoxylates. These products are, for example, commercially available under the name Genapol® or Lutensol®. They include, for example, ethoxylated mono-, di- and tri-alkylphenols (EO: from 3 to 50, alkyl substituted radical: $C_4$ to $C_{12}$) and ethoxylated fatty alcohols (EO: from 3 to 80; alkyl radical: $C_8$ to $C_{36}$), especially $C_{12}$-$C_{14}$-fatty alcohol (3-8) ethoxylates, $C_{13}$-$C_{15}$-oxo alcohol (3-30) ethoxylates, $C_{16}$-$C_{18}$-fatty alcohol (11-80) ethoxylates, $C_{1-10}$-oxo alcohol (3-11) ethoxylates, $C_{1-3}$-oxo alcohol (3-20) ethoxylates, polyoxyethylene sorbitanmonooleate with 20 ethylene oxide groups, copolymers of ethylene oxide and propylene oxide with a minimum content of 10% by weight of ethylene oxide, the polyethylene oxide (4-20) ethers of oleyl alcohol and the polyethylene oxide (4-20) ethers of nonylphenol. Particularly suitable are the polyethylene oxide (4-20) ethers of fatty alcohols, especially of oleyl alcohol.

When nonionic emulsifiers are used, the amount thereof, based on the total amount of monomers used, is typically from 0.05 to 10 parts by weight, preferably from 0.5 to 7.0 parts by weight, more preferably from 0.5 to 5 parts by weight and most preferably from 1.0 to 3.5 part by weight. It is also possible to use mixtures of nonionic emulsifiers.

Instead of or in addition to nonionic emulsifiers, it is possible to use ionic emulsifiers, preferably anionic emulsifiers. Examples include sodium, potassium and ammonium salts of straight-chain aliphatic carboxylic acids of chain length $C_{12}$-$C_{20}$, sodium hydroxyoctadecanesulfonate, sodium, potassium and ammonium salts of hydroxy fatty acids of chain length $C_{12}$-$C_{20}$ and their sulfation and/or acetylation products thereof, alkyl sulfates, also in the form of triethanolamine salts, alkyl-($C_{10}$-$C_{20}$)-sulfonates, alkyl($C_{10}$-$C_{20}$)-arylsulfonates, dimethyldialkyl-($C_8$-$C_{18}$)-ammonium chloride, and sulfation products thereof, alkali metal salts of sulfosuccinic esters with aliphatic saturated monohydric alcohols of chain length $C_4$-$C_{16}$, sulfosuccinic 4-esters with polyethylene glycol ethers of monohydric aliphatic alcohols of chain length $C_{10}$-$C_{12}$ (disodium salt), sulfosuccinic 4-esters with polyethylene glycol nonylphenyl ether (disodium salt), sulfosuccinic acid biscyclohexyl ester (sodium salt), lignosulfonic acid and the calcium, magnesium, sodium and ammonium salts thereof, resin acids, hydrogenated and dehydrogenated resin acids and alkali metal salts thereof, sodium (dodecylated diphenyl ether) disulfonate and sodium laurylsulfate, or ethoxylated sodium lauryl ether sulfate (3 EO). It is also possible to use mixtures of ionic emulsifiers.

When ionic emulsifiers are used, the amount thereof, based on the total amount of monomers used, is typically from 0.05 to 10 parts by weight, preferably from 0.05 to 5.0 parts by weight, more preferably from 0.05 to 3.65 parts by weight and most preferably from 0.1 to 1 part by weight. It is also possible to use mixtures of ionic emulsifiers.

When emulsifiers are used, the total amount thereof, based on the total amount of the monomers used, is typically from 0.05 to 10 parts by weight, preferably from 0.05 to 5.0 parts by weight, more preferably from 0.05 to 3.65 parts by weight and most preferably from 0.1 to 1 part by weight.

The multi-stage emulsion polymerization of the present process can be carried out for example, by inclusion polymerization, as described in US 2009/0069495. In such a process, the first polymerization stage is conducted until at least 90% of the monomers in the first monomer composition have been polymerized. The second monomer composition in pure form or in the form of a solution or an emulsion is then added followed by an initiator for the second stage polymerization. In this way, the monomers of the second monomer composition may diffuse into polymer particles from the first stage before polymerizing themselves.

Particular preference is given to using multistage dispersions in which the monomers in the second stage are used in pure form. A partition equilibrium is established between the monomers added in the second stage and the reaction product of the first stage. The monomers hydrophobic with respect to water which are added in the second stage probably diffuse fully into the polymer particles prepared in the first stage and are polymerized into these particles. This form of emulsion polymerization is therefore also referred to as inclusion polymerization.

The start of the second polymerization (second stage) can be effected immediately after the addition of the monomer(s) in the second stage, or the polymerization mixture is left to stand for a further period, for example from 10 to 60 minutes, before initiator is added.

Moreover, the glass transition temperatures of the dispersions prepared by inclusion polymerization differ from the glass transition temperatures of dispersions comprising particles of the same monomer composition which have been prepared by conventional one-stage emulsion polymerization.

Each stage of the multi-stage polymerization of the present process is conducted free-radical emulsion polymerization. The free-radical emulsion polymerization in the first stage can be carried out in a manner known per se in a batchwise process, in a feed process, in a combined batchwise/feed process or in a continuous process. In the first stage, preference is given to working in a combined batchwise/feed process and particular preference to working in a feed process, in which case an amount of the monomers used in the first stage, for example from 1 to 15% by weight, is typically initially charged to start the polymerization. The monomers can be metered in either together or in separate feeds. The first stage is polymerized under ethylene pressure, which can be varied during the feeding of the monomers. In addition, it may be advantageous in particular embodiments to establish specific particle sizes and particle size distributions at the start of the first stage by performing a seed polymerization.

The emulsifier and/or the protective colloid also used for stabilization can be initially charged completely at the start of the first stage, or can be initially charged in part and metered in part, or can be metered in completely during the performance of the first stage.

The polymerization temperature during the first stage varies typically within the range from 20 to 120° C., preferably within the range from 30 to 110° C. and most preferably within the range from 45 to 95° C.

To start the polymerization, the initiators of free radical polymerization known per se can be used. Examples thereof are hydrogen peroxide, benzoyl peroxide, cyclohexanone peroxide, isopropylcumyl hydroperoxide, persulfates of potassium, sodium and ammonium, peroxides of evennumbered saturated monobasic aliphatic carboxylic acids of chain length $C_8$-$C_{12}$, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctoate, bis(3,5,5-trimethyl)hexanoyl peroxide, tert-butyl perpivalate, hydroperoxypinane, p-menthane hydroperoxide. The aforementioned compounds can also be used within a redox system, in which case it is also possible to use transition metal salts such as iron(II) salts, or other reducing agents. The reducing agents or regulators used may also be alkali metal salts of oxymethanesulfinic acid, mercaptans of chain length $C_{10}$-$C_{14}$, buten-(I)-ol-(3), hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea and formic acid.

However, preference is given to using water-soluble persulfates, especially ammonium persulfate or sodium persulfate, to initiate the polymerization.

The initiator for the polymerization used in the first stage can be added completely to the reaction mixture at the start of the first stage or can be added in part or metered in part in the course of the first stage or can be metered in completely during the performance of the first stage.

After the complete or virtually complete conversion of at least 90%, preferably at least 95%, of the monomers used in the first stage, the second stage is commenced.

To this end, the entire amount of the monomers provided for the next stage of the polymerization process is added in pure form, in the form of a solution or in the form of a monomer emulsion to the polymerization mixture obtained in the first stage. In this step too, the monomers can be metered in either together or in separate feeds. The duration for the addition varies typically within the range from 5 to 60 minutes, preferably from 15 to 30 minutes.

The emulsion polymerization of the second stage can be performed with or without a pre-emulsion, preferably without a pre-emulsion.

In the second stage, further emulsifier and/or further protective colloid can be initially charged completely at the start of the second stage or during the second stage, can be initially charged in part and metered in part, or can be metered in completely during the performance of the second stage.

The monomers are added to the reaction mixture in the second stage in pure form or in the form of solutions in organic solvents or in the form of an emulsion, especially an aqueous emulsion. Preference is given to adding the monomers to the reaction mixture in liquid and pure form.

After the addition of the monomers in the second stage polymerization can be commenced by adding the initiator. This can be done immediately after the second stage has ended or after a rest phase of, for example, from 15 to 120 minutes. It is assumed that the monomers supplied in the second stage can be distributed in or on the polymer particles formed in the first stage during the performance of the second stage and within any rest phase which follows.

To restart the polymerization in the second stage of the process, the initiators of free-radical polymerization known per se can be used. Examples thereof are listed above in the description of the first stage.

In this case too, the initiator for the polymerization in the second stage can be added completely to the reaction mixture at the start of the second stage or can be added in part and metered in part in the course of the second stage or can be metered in completely during the performance of the second stage.

The polymerization temperature during the second stage varies typically within the range from 20 to 120° C., preferably within the range from 30 to 110° C. and most preferably within the range from 45 to 95° C.

Before starting the second stage of the polymerization, it is advisable to increase the temperature of the reaction mixture before or during the addition of the initiator.

On completion of polymerization in the second stage, for demonomerization, a further, preferably chemical aftertreatment, especially with redox catalysts, for example combinations of the abovementioned oxidizing agents and reducing agents, may follow. In addition, residual monomer present can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm and most preferably <50 ppm).

The aqueous multistage dispersions produced by the present process typically have a solids contents of from 20 to 70% by weight, preferably from 30 to 65% by weight and more preferably from 40 to 60% by weight, a pH between 2 and 7, preferably between 2.5 and 6 and a MFFT of less than 20° C., preferably less than 10° C. and most preferably less than 5°.

When used in an exterior wood protection paint, the aqueous multistage dispersions produced by the present process is typically combined with one or more conventional fillers and/or pigments. In this context, pigments are understood as meaning solids which have a refractive index greater than or equal to 1.75, whereas fillers are understood as meaning solids which have a refractive index of less than 1.75. Typically, a paint formulation produced from the present multistage dispersions comprises from 15 to 60 percent by weight, preferably from 25 to 55 percent by weight, more preferably from 30 to 55 percent by weight, of the present dispersion, from 5 to 30 percent by weight, preferably from 10 to 25 percent by weight, more preferably from 10 to 20 percent by weight, of pigment and from 5 to 40 percent by weight, preferably from 10 to 30 percent by weight, more preferably from 10 to 20 percent by weight of filler.

Examples of mineral fillers are alkaline earth metal oxides, alkaline earth metal carbonates and/or silicate fillers, in particular calcium carbonate, mica, feldspar, kaolin, quartz powders and/or particulate quartz fractions and marble powders and/or particulate marble fractions. When used in plasters and renders, the filler generally has a particle size of at least 40 µm, whereas when used in a paint, the filler typically has a size of 1 to 40 µm.

Pigments may be any inorganic or organic and may be color-imparting or opaque finely divided solids. Preferred pigments have a mean diameter for the primary particle of less than or equal to 1 µm, preferably from 0.1 to 0.5 µm, determined by sedimentation analysis according to DIN 66115. Examples of inorganic pigments are metal oxides, such as titanium dioxide, iron oxide or zinc oxide, in particular titanium dioxide. Examples of organic pigments are phthalocyanines, in particular phthalocyanine blue, or diaryl pigments, azo pigments or quinacridone pigments.

To disperse the fillers and pigments in water, dispersing agents and/or auxiliaries based on anionic or non-ionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners may also be added to the coating compositions described herein. Thickeners which may be used include, inter alia, preferably cellulose derivates such as methylcellulose (MC), hydroxyethylcellulose (HEC) and carboxymethyl-cellulose. Other thickeners which may be used include casein, gum arabic, gum tragacanth, starch, sodium alginate, polyvinyl alcohol, polyvinylpyrrolidone, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), and polyether polyols (PEPO) are also available. Inorganic thickeners, such as, for example, bentonites or hectorite, may also be used.

For various applications, it is sometimes also desirable to include small amounts of other additives, such as bactericides, pH modifiers, and antifoamers, incorporated in the latex paint compositions herein. This may be done in a conventional manner and at any convenient point in the preparation of the latexes.

The coating compositions may also comprise crosslinking additives. Such additives may be: aromatic ketones, for example alkyl phenyl ketones, which may have one or more substituents on the phenyl ring, or benzophenone and substituted benzophenones as photoinitiators. Photoinitiators suitable for this purpose are disclosed, for example, in DE-A-38 27 975 and EP-A-0 417 568. Suitable crosslinking compounds are also water-soluble compounds having at least two amino groups, for example dihydrazides of aliphatic dicarboxylic acids, as disclosed, for example, in DE-A-39 01 073, when the vinyl ester copolymer contains monomers containing carbonyl groups in copolymerized form.

It addition, it is possible to use, in the coating compositions, as further additives, waxes based on paraffins and polyethylene; and matting agents; defoamers; in can preservatives, such as CIT (Chlor isothiazolinone), MIT (Methyl iso thiazolinone) and BIT (Benzyl isothiazolinon); film preservatives (biocides), such as OIT (Octyl isothiazolinone), IPBC (3-Iodo-2-propynyl butyl carbamate), zinc pyrithione, Irgarol, and Terbutryn; hydrophobicizing agents; UV stabilizers; fibers; plasticizers; coalescent agents and further additives known to those skilled in the art. Examples of suitable plasticizers include dimethyl phthalate, diisobutyl phthalate, diisobutyl adipate, Coasol B® and Plastilit 3060®. Examples of suitable coalescent agents include Texanol, Dowanol DPnB, Dowanol TPnB, butylglycolacetate, butylglycol and Butyldiglycol. Preferably no coalescent agents and plasticizers are used. Examples of defoamers are mineral oil defoamers or silicone defoamers. Examples of UV stabilizers are sterically hindered piperidine compounds (HALS) or benzophenone derivatives.

Wood protection paints produced from the emulsions herein show a good block resistance and high elasticity. This application profile is especially needed when coatings are applied on substrates which change their dimensions during weathering like wood.

The following non-limiting Examples serve to illustrate the invention. The parts and percentages reported in the Examples are based on weight, unless stated otherwise.

Example 1

VAE with a Second Stage (20% Inclusion Phase) of Methyl Methacrylate, $T_g$ of 105° C.

An aqueous solution consisting of the following ingredients was introduced into a pressure reactor having a stirrer, jacket heating and metering pumps: 25755 g of water, 84 g of sodium acetate, 1430 g of a 70% active aqueous solution of an alkyl ethoxylate having 30 mol of ethylene oxide, 1112 g of 15% active sodium lauryl sulphate, 555 g of a 30% active aqueous sodium vinylsulphonate, 890 g of a 15% active aqueous polyvinyl alcohol solution, 13.5 g of sodium metabisulfite and 0.08 g of $(NH_4)_2Fe(SO_4)_2$.

The atmosphere inside the reactor was freed from oxygen and ethylene was pressurized in the reactor. At an ethylene pressure of 15 bar, a mixture of 14 g of vinyl triethoxysilane and 1707 g of vinylacetate, as well as 665 g of 11% sodium persulphate aqueous solution was metered in. The system was heated up to internal temperature of 65° C. At 65° C., the pressure was raised to 35 bar and a mixture of 186 g of vinyltriethoxysilane and 22680 g of vinylacetate was metered in 210 minutes. The pressure was kept at 35 bar until 3420 g of Ethylene was in the reactor. Jacket cooling was applied to remove the heat of reaction. After 210 minutes 5550 g methyl methacrylate, as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Example 2

VAE with a Second Stage (150% Inclusion Phase) of Methyl Methacrylate, $T_g$ of 105° C.

An aqueous solution consisting of the following ingredients was introduced into a pressure reactor having a stirrer, jacket heating and metering pumps: 24598 g of water, 84 g of sodium acetate, 1430 g of a 70% active aqueous solution of an alkyl ethoxylate having 30 mol of ethylene oxide, 1112 g of 15% active sodium lauryl sulphate, 555 g of a 30% active aqueous sodium vinylsulphonate, 890 g of a 15% active aqueous polyvinyl alcohol solution, 13.5 g of sodium metabisulfite and 0.08 g of $(NH_4)_2Fe(SO_4)_2$.

The atmosphere inside the reactor was freed from oxygen and ethylene was pressurized in the reactor. At an ethylene pressure of 15 bar, a mixture of 14 g of vinyl triethoxysilane and 1707 g of vinylacetate, as well as 665 g of 11% sodium persulphate aqueous solution was metered in. The system was heated up to internal temperature of 65° C. At 65° C., the pressure was raised to 35 bar and a mixture of 186 g of vinyltriethoxysilane and 22680 g of vinylacetate was metered in 210 minutes. The pressure was kept at 35 bar until 3420 g of Ethylene was in the reactor. Jacket cooling was applied to remove the heat of reaction. After 210 minutes 4163 g methyl methacrylate, as well as 625 g of a 5.5% sodium persulphate aqueous solution was added in 30 minutes. The temperature was raised to 85° C. and kept for 1 hour after all additions, and then the system was cooled down. The resulting dispersion was filtered, and had a solid content of 54% and the measured MFFT was 0° C.

Comparative Example 1

Standard VAE, Mowilith LDM 1871

This Example employed a commercial vinyl acetate ethylene copolymer dispersion supplied by Celanese Emulsions as Mowilith® LDM 1871 and having only one polymer phase with a Tg of 11° C., a MFFT of 0° C. and a solids content of 53%

Example 3

Wood Protection Paints

Wood protection paints were prepared according to the following recipe given in Table 1 using the emulsions E1, E2 and as comparison C1.

TABLE 1

| Ingredients | p.b.w. |
| --- | --- |
| Water | 77.0 |
| AMP 90 | 3.0 |
| Dispersing agent, Additol VXW 6208 | 5.0 |
| Defoamer BYK 044 | 2.0 |
| PU Thickener, Tafigel PUR 40 | 3.0 |
| Titanium dioxide Kronos 2310 | 190.0 |
| Calcium carbonate Omyacarb 5 GU | 135.0 |
| Mica Celia 100 L | 25.0 |
| Water | 30.0 |
| Emulsion adjusted to 50% solid with water | 510.0 |
| Dowanol DPnB | 10.0 |
| Film protection agent Acticide MKB 3 | 10.0 |
| Total | 1000.0 |

A waterborne wood primer and two layers of the wood protection paint according Table 1 were applied on spruce panels. After each application the panels were dried for 24 hours. The $L_{start}$-value of the wood protection paint surface on the final test panel was measured according DIN 6174 with a color guide spectrophotometer from BYK-Gardner. The tests specimens were then laid out on a outdoor weathering station in Frankfurt Liederbach at an angle of 45° to south direction. After 6 months outdoor exposure the $L_{6\,month}$ value of each wood protection paint was measured as described for $L_{start}$. The delta-L value was calculated according the following equation:

Delta $L = L_{start} - L_{6\,month}$

The smaller the delta-L value, the smaller is the dirt pick up and the change in whiteness compared to the start value and therefore the better the outdoor performance. A delta-L value >7 after 6 months indicates a poor outdoor performance (high dirt pick up) whereas a delta L value of 0 to 7 means for a good outdoor performance. Furthermore the coating was checked whether there are blisters or cracks because of the outdoor exposure.

TABLE 2

| Wood paint based on emulsion | Delta L after 6 month 45° weathering south | Blistering* (0 to 5 rating) | Cracks** (0 to 5 rating) | Algal/fungal attack | Outdoor weathering performance |
|---|---|---|---|---|---|
| Example 1 | 4.8 | 0 | 0 | Not detectable | Good |
| Example 2 | 6.0 | 0 | 0 | Not detectable | Good |
| Comparison Example 1 | 8.5 | 0 | 0 | Not detectable | Bad |

*0 means no blistering, 5 means strong blistering
**0 means no cracks and 5 means a lot of cracks

The invention claimed is:

1. A wood protection paint comprising a copolymer emulsion prepared by an emulsion polymerization process comprising:
   (a) polymerizing, in a first stage and under ethylene pressure, a first monomer composition comprising from 60 weight percent to 95 weight percent of at least one vinyl ester, and from 5 weight percent to 40 weight percent ethylene to produce a first stage product having a glass transition temperature $T_g$ of less than 25° C.; and
   (b) polymerizing, in a second stage and in the presence of said first stage product, a second monomer composition such that the polymer produced by said second monomer composition has a glass transition temperature $T_g$ of at least 95° C.

2. A wood protection paint according to claim 1, wherein the vinyl ester is vinyl acetate.

3. A wood protection paint according to claim 1, wherein the copolymer produced by said first monomer composition has a glass transition temperature $T_g$ in the range of 5° C. to 15° C.

4. A wood protection paint according to claim 1, wherein the first monomer composition further comprises from 0.05 weight percent to 5 weight percent of at least one of an ethylenically unsaturated mono- and/or dicarboxylic acid, an ethylenically unsaturated sulfonic acid, an ethylenically unsaturated phosphoric acid, an ethylenically unsaturated phosphonic acid, and an amide of an ethylenically unsaturated mono- and/or dicarboxylic acid.

5. A wood protection paint according to claim 1, wherein the polymer produced by said second monomer composition has a glass transition temperature $T_g$ from 95 to 170° C.

6. A wood protection paint according to claim 1, wherein the polymer produced by said second monomer composition has a glass transition temperature $T_g$ from 95° C. to 160° C.

7. A wood protection paint according to claim 1, wherein the polymer produced by said second monomer composition has a glass transition temperature $T_g$ from 95° C. to 150° C.

8. A wood protection paint according to claim 1, wherein the second monomer composition comprises at least 90 weight percent of a meth(acrylic) ester or a mixture of at least two different (meth)acrylic esters.

9. A wood protection paint according to claim 1, wherein the second monomer composition comprises at least 90 weight percent of methyl methacrylate, cyclohexyl methacrylate, isobornyl methacrylate or a mixture thereof.

10. A wood protection paint according to claim 1, wherein the second monomer composition comprises at least 90 weight percent of a mixture of methyl methacrylate with an acrylic ester selected from the group consisting of butyl acrylate and ethylhexyl acrylate.

11. A wood protection paint according to claim 8, wherein the second monomer composition further comprises from 0.05 weight percent to 5 weight percent of at least one of an ethylenically unsaturated mono- and/or dicarboxylic acid, an ethylenically unsaturated sulfonic acid, an ethylenically unsaturated phosphoric acid, an ethylenically unsaturated phosphonic acid, and an amide of an ethylenically unsaturated mono- and/or dicarboxylic acid.

12. A wood protection paint according to claim 1, wherein the weight ratio of the first monomer composition to the second monomer composition is in the range 60:40 to 95:5.

13. A wood protection paint according to claim 1, wherein each of the first and second monomer compositions further comprise an anionic emulsifier.

14. A wood protection paint according to claim 1, wherein each of the first and second monomer compositions further comprise a nonionic emulsifier.

15. A wood protection paint according to claim 1, further comprising at least one pigment.

* * * * *